Patented Dec. 25, 1945

2,391,848

UNITED STATES PATENT OFFICE 2,391,848

AMMONOLYSIS OF ARYL HALIDES

Harold R. Slagh, Midland, Mich., assignor to The Dow Chemical Company, Midland, Mich., a corporation of Michigan No Drawing. Application July 2, 1942,
Serial No. 449,510

7 Claims. (Cl. 260—581)

This invention concerns an improved method for the ammonolysis of aryl halides. It particularly concerns a method whereby the ammonolysis reaction may be carried out catalytically in a reactor of iron, steel, or other ferrous metal without the occurrence of appreciable corrosion.

In a well known method for the manufacture of aromatic amines a mixture of an aryl halide, e. g. chlorobenzene, an aqueous ammonia solution and a minor amount of an ammonolysis catalyst, e. g. a copper compound and preferably a cuprous compound, is heated with agitation in an iron or steel autoclave to a reaction temperature of usually between 150° and 250° C. When a new autoclave is placed in service considerable corrosion takes place and also a large part of the catalytic copper compound is usually destroyed by deposition of metallic copper on the walls of the reactor, with the result that the desired reaction occurs sluggishly and incompletely. During continued use of the autoclave in the process these undesirable effects become less pronounced, due it is believed to the formation of a protective film on the inner walls of the reactor. However, corrosion of the reactor occurs to an appreciable extent throughout its active life.

It has been suggested that the corrosion of the autoclave and also the formation of by-products, e. g. diaryl amines, which occur during ammonolysis of an aryl halide to form a monoaryl amine in accordance with the above-mentioned usual method are due to the presence of the ammonium halide which is formed in the ammonolysis reaction and that such corrosion and by-product formation might be avoided by carrying the reaction out in the presence of sufficient alkali metal or alkaline earth metal base to decompose the ammonium halide product. Reports concerning tests of this suggested mode of operation vary as to its effectiveness for the intended purpose. They also indicate that such use of an alkali in amount sufficient to decompose the ammonium halide often results in serious operating difficulties and in increased by-product formation so that it is unsatisfactory as a method for carrying the reaction out on a commercial scale. For instance in British Patent 370,744 it is reported that in the ammonolysis of 4.4'-dichloro-diphenyl to form benzidine, corrosion of the autoclave may be avoided by the presence of any alkali metal or alkaline earth metal base in amount chemically equivalent to the dichloro-diphenyl, but it is pointed out that such use of a strong alkali, e. g. sodium hydroxide, results in considerable hydrolysis with consequent lowering of the yield of benzidine. The patent indicates lime to be satisfactory for the purpose. However, Groggins et al., in Ind. Eng. Chem. 25, 170 (1933), show that the presence of either lime or sodium hydroxide in amount sufficient to decompose the ammonium chloride formed during an ammonolysis reaction results in considerable hydrolysis of the aryl chloride reactant with consequent lowering both in the yield and the purity of the amine product. The use of lime in such large proportion, i. e. in amount sufficient to destroy the ammonium halide formed by the reaction, is also disadvantageous in that the bulky precipitate of lime together with copper hydroxide, which is formed upon treatment of the aqueous layer of the reacted mixture for purpose of recovering the catalyst, is inconvenient to handle. In so far as I am aware the effect of minor amounts of alkali or alkaline earth metal bases on ammonolysis reactions has not heretofore been studied.

I have discovered that the presence of only a minor proportion of an oxide or hydrate of calcium, tin, lead, arsenic, or antimony during ammonolysis of an aryl halide in an iron or steel reactor reduces greatly the amount of corrosion which takes place. It also tends to prevent destruction of the catalyst with deposition of copper on the walls of the reactor and thereby aids in preserving the catalyst in the active form required for rapid and substantially complete reaction.

It is not essential that an oxide or hydrate of such element be employed per se in the process. Instead, it may be formed in situ and perhaps only momentarily by employing as the starting material a compound of one of said elements which is hydrolyzable by water at the ammonolysis temperature to form the oxide or hydrate of the element. Examples of such hydrolyzable compounds of the elements are calcium carbonate, calcium bicarbonate, lead carbonate, basic lead carbonate, sodium arsenite, potassium arsenite, sodium stibnate, etc. Accordingly, where the protection against corrosion is referred to herein as being provided by an oxide or hydrate of one of the elements Ca, Pb, Sn, As, or Sb, it will be understood that such hydrolyzable compound of the element may be added as the starting material. The chemical form or compound of the element which ultimately affords the protection against corrosion of the reactor is not known.

The proportion of such protective agent required is far less than would be chemically equivalent to the ammonium halide that is formed by the ammonolysis. Between 0.08 and 0.25 molecular equivalent of agent per mole of the aryl halide reactant is sufficient to protect a new or an acid-cleaned iron or steel reactor against corrosion when it is first placed in service in carrying out an ammonolysis reaction. In carrying the reaction out, e. g. in continuous manner, it is feasible to react only a portion of the aryl halide during a single cycle through the autoclave and to recover and recycle the unreacted aryl halide. In such instance, the proportion of the stabilizing agent may be reduced correspondingly. During repeated or continual use of the reactor in the process the proportion of the protective agent may be reduced to a very small value, e. g. 0.01–0.08 molecular equivalent per mole of aryl halide, or such agent may in some instances be omitted from the reaction mixture without occurrence of appreciable corrosion. However, prolonged or often repeated use of the reactor in carrying out ammonolysis reactions without at least periodic employment of a small amount of such protective agent in the reaction mixture does result in appreciable corrosion. By employing the protective agent in the small proportion just mentioned, by-product formation, e. g. hydrolysis of the aryl halide reactant, is not increased appreciably nor are excessively bulky precipitates which are difficult to handle during recovery of the catalyst obtained.

The protective action afforded by the oxides and hydrates of Ca, Pb, Sn, As, and Sb when used in the minor proportion just stated is not due primarily to the possession of basic properties, for certain of these compounds, e. g. $As_2O_3$ and $Sb_2O_5$, are acidic rather than basic. Also other basic compounds, e. g. sodium hydroxide, potassium hydroxide, barium hydroxide, sodium carbonate, sodium bicarbonate, etc., fail to prevent corrosion of the reactor when used in similar proportion. It is believed that the protective agents prevent corrosion of the reactor by causing the formation of a thin protective film on the inner walls of the autoclave, but the invention is not restricted to this theory as to the reason for the protection afforded. Of the above-mentioned compounds which do have the property when used in minor proportion of preventing corrosion of the iron or steel reactor, the basic compounds of calcium have proven to be the most effective.

Except for the fact that one or more oxides, hydrates, or hydrolyzable compounds of calcium, tin, lead, arsenic, or antimony are added to the reaction mixture in the small proportions above-specified, the ammonolysis may be carried out as usual. As is well known, the proportions of the reactants and the ammonolysis catalyst may be varied widely, although usually 3 molecular equivalents or more of ammonia as an at least 20 per cent aqueous solution thereof and between 0.1 and 0.2 atomic weight of copper in the form of a cuprous compound, e. g. cuprous chloride or cuprous oxide, are employed per mole of the aryl halide. The reaction is carried out in a bomb or autoclave usually at temperatures between 150° and 250° C. although lower or higher temperatures, e. g. as high as 350° C., may sometimes be employed. After completing the reaction, the reactor is cooled and discharged and the products are separated by conventional procedure, e. g. the aqueous and organic layers of the reacted layer are separated, the organic layer is distilled to recover the aryl amine product and the aqueous layer is treated to recover the copper-containing catalyst therefrom.

The following examples describe a number of ways in which the principle of the invention has been applied and illustrate certain of its advantages, but are not to be construed as limiting the invention.

EXAMPLE 1

In the first of two series of comparative experiments a mild-steel bomb having a capacity of about 375 cubic centimeters was used repeatedly in carrying out the reaction for the ammonolysis of chlorobenzene to form aniline in the absence of alkalies other than ammonia. The iron lost from the bomb due to corrosion was measured in each experiment. Before being employed in the first of these experiments, the bomb was thoroughly cleaned by filling the same with concentrated nitric acid, permitting it to stand at room temperature for one hour, then emptying it of acid and washing it thoroughly with distilled water. The same bomb was employed in the successive experiments of the series. It was cleaned only by washing with water between the experiments. The reason for carrying out a series of experiments instead of only a single experiment, to determine the corrosive action of the reaction mixture on the bomb was that such corrosive action decreases during the first few experiments so that a number of successive runs with the same bomb, e. g. three or more successive experiments, are required in order to obtain a representative corrosion value. The procedure in carrying out each experiment was to charge the bomb with a mixture of 41.6 grams (0.37 mole) of chlorobenzene, 75 grams of an aqueous ammonia solution of 28 per cent concentration, and a minor amount of cuprous oxide or hydroxide, and to heat the closed bomb at 250° C. for 4 hours while rotating the same. The catalyst employed in each of the first two experiments was 4.0 grams of cuprous oxide which contained iron compounds as impurities in amount corresponding to 0.16 gram of iron. The catalyst employed in the third experiment was cuprous oxide and/or hydroxide recovered by precipitation from the first of the reaction mixtures and the catalyst used in the fourth experiment was that recovered from the second of the reaction mixtures. After completing a reaction, the bomb was cooled and opened. The reaction mixture was filtered, the bomb was washed thoroughly with water, and the washings were also passed through the filter. The residue (principally iron oxide and/or hydroxide) was analyzed to determine its content of iron. By subtracting from the value thus obtained the iron content of the catalyst, a value representing the amount of iron lost from the bomb by corrosion, is obtained. After filtering the reacted mixture, the aqueous and organic layers thereof were separated, and an aliquot portion of the aqueous layer was analyzed for inorganic chlorides, whereby the "per cent conversion," i. e. per cent of the chlorobenzene employed which had been consumed, was determined. The copper-containing catalyst was recovered by treating the remainder of the aqueous layer with sufficient dilute sodium hydroxide solution to precipitate the copper as its oxide and/or hydroxide and filtering. The following table indicates the extent of the reaction as "per cent conversion" of the chlorobenzene and also the grams of iron corroded from the bomb in each experiment.

Table I

| Run No. | Percent conversion | Corrosion, gms. of Fe |
|---|---|---|
| 1 | 76 | 0.080 |
| 2 | 55 | 0.163 |
| 3 | 69.3 | 0.158 |
| 4 | 77.4 | 0.144 |

From the foregoing table it will be seen that in the first series of experiments, carried out without addition of any alkali other than ammonia, the average loss of iron by corrosion of the bomb per experiment was 0.136 gram. It will also be noted that the conversion was highest in those experiments in which the corrosion was least severe.

A second series of five experiments were carried out similarly, starting with a bomb which had been thoroughly cleaned with nitric acid, except that in each of the first four of these successive experiments lime in the amount stated in the Table II was initially added to the reaction mixture. The last of this series of experiments was carried out in the absence of added lime in order to determine whether the protection against corrosion afforded by the lime in the preceding experiments was due to the formation of a substantially inert surface on the inner walls of the bomb. In each of this series of experiments the bomb was charged with a mixture of 41.6 grams (0.37 mole) of chlorobenzene, 24.5 grams (1.44 moles) of ammonia in the form of an aqueous solution of 28 per cent concentration, 4.0 grams of cuprous oxide which contained iron compounds in amount corresponding to 0.16 gram of iron, and calcium oxide in the amount stated in the table. The bomb was heated at 250° C. for 4 hours, after which the per cent conversion and the amount of corrosion which had occurred were determined as hereinbefore described. In each experiment corrosion of the bomb was too slight for measurement. The results obtained are summarized in the following table.

Table II

| Run No. | CaO, gm. moles | Per cent conversion | Corrosion, gms. of Fe |
|---|---|---|---|
| 1 | 0.18 | 87 | 0 |
| 2 | 1.134 | 89 | 0 |
| 3 | 0.09 | 87 | 0 |
| 4 | 0.045 | 83 | 0 |
| 5 | None | 87 | 0 |

It will be noted that the conversions in this second series of experiments are far higher than in the first series of experiments carried out in the absence of lime, indicating that the lime had aided in preserving the copper compounds in their catalytically active form. It will also be noted that the protection against corrosion afforded by the lime continued throughout the entire series of experiments even though the proportion of lime was reduced in the successive experiments and the last experiment was carried out without addition of lime. These results indicate that the protection of the reactor afforded by the lime is due to the formation of a corrosion-resistant film on the inner surface of the bomb.

EXAMPLE 2

In each of two comparative experiments a mild-steel bomb of approximately 275 cubic centimeters capacity and which had been cleaned thoroughly with nitric acid was used for the ammonolysis of chlorobenzene to form aniline. In one of the experiments the mixture charged into the bomb consisted of 41.6 grams (0.37 mole) of chlorobenzene, 24.5 grams (1.44 moles) of ammonia as an aqueous ammonia solution of 28 per cent concentration, and 4.0 grams of cuprous oxide. The reaction mixture employed in the other experiment was identical, except that 2.5 grams (0.045 mole) of calcium oxide was also added. Each bomb was heated at 250° C. for 4 hours. The bombs were then emptied and the per cent conversion, i. e. the proportion of the chlorobenzene employed which has been reacted, was determined as in Example 1. Each bomb was inspected to ascertain whether copper had been deposited on its inner surfaces. In Table III, which summarizes the results of these tests, the experiments are identified by statement as to whether lime was employed.

Table III

| Run No. | CaO used | Per cent conversion | Bomb plated with Cu |
|---|---|---|---|
| 1 | No | 83 | Yes. |
| 2 | Yes | 87 | No. |

These tests also indicate that the protective action of the lime is due to it causing the formation of a corrosion-resistant film on the walls of the bomb, rather than to its action in neutralizing a portion of the ammonium chloride which is formed. It will be noted that the proportion of chlorobenzene reacted was highest in the experiment using lime.

EXAMPLE 3

In each of two experiments alpha-naphthylamine was prepared by heating a mixture of 60 grams (0.37 mole) of alpha-chloronaphthalene, 21 grams (1.18 moles) of ammonia as an aqueous ammonia solution of 28 per cent concentration, and 4.0 grams of cuprous oxide containing iron compounds in amount corresponding to 0.16 gram of iron in a mild-steel bomb of approximately 275 cubic centimeters capacity, which bomb had been cleaned with nitric acid prior to employment. In one of the experiments 2.5 grams (0.045 mole) of calcium oxide was also initially added to the reaction mixture, but in the other experiment lime was omitted. Each reaction was carried out by heating the bomb at 250° C. for 4 hours while rotating the same. The per cent conversion of the chloronaphthalene, i. e. the proportion of chloronaphthalene consumed, and the grams of iron lost from the bomb by corrosion were determined as in Example 1. In Table IV, which summarizes the results obtained, the experiments are identified by statement as to whether lime was used.

Table IV

| Run No. | CaO used | Per cent conversion | Corrosion, gms. of Fe |
|---|---|---|---|
| 1 | No | 48.8 | 0.49 |
| 2 | Yes | 51.9 | None |

EXAMPLE 4

A series of experiments were carried out for purpose of determining the relative value of a variety of substances, including many basic compounds, as agents for preventing the corrosion of reactors constructed of a ferrous metal during use in carrying out ammonolysis reactions. The reaction mixture employed in each experiment consisted of 41.6 grams (0.37 mole) of chlorobenzene, 21 grams (1.18 moles) of ammonia as an aqueous solution of 28 per cent concentration, 4.0 grams of cuprous oxide-containing iron compounds in amount corresponding to 0.16 gram of iron, and the added agent named in Table V in the amount given. The reactor employed in each experiment was a mild steel bomb of about 275 cubic centimeters capacity which had been cleaned thoroughly with nitric acid. Each reaction was carried out by heating and rotating the charged bomb at 250° C. for 4 hours. The per cent conversion of the chlorobenzene and the grams of iron lost from the bomb by corrosion were determined as in Example 1 and are given in Table V. For purpose of comparison, the table includes as a "blank" the average values for per cent conversion and for corrosion of a similar bomb which were obtained in the first series of experiments in Example 1 wherein aniline was prepared under reaction conditions similar to those described above, except that no agent other than the usual reactants and copper-containing catalyst was employed.

*Table V*

| Run No. | Agent tested | | Per cent conversion | Corrosion, gms. of Fe |
|---|---|---|---|---|
| | Kind | Gms. | | |
| Blank | None | 0 | 69.4 | 0.136 |
| 1 | CaO | 2.5 | 81.9 | None |
| 2 | Na₂HAsO₃ | 0.72 | 88.0 | 0.022 |
| 3 | Sb₂O₃ | 2.74 | 83.7 | 0.011 |
| 4 | PbO | 2.5 | 87.0 | 0.015 |
| 5 | SnO₂ | 2.5 | 85.5 | 0.021 |
| 6 | Na₂CO₃ | 2.5 | 66.0 | 1.36 |
| 7 | CaCl₂ | 0.1 | 44.1 | 2.23 |
| | NaHCO₃ | 0.1 | | |
| 8 | BaO | 2.5 | 61.7 | 1.72 |
| 9 | SrO | 2.5 | 87.0 | 0.33 |
| 10 | MgO | 2.5 | 46.5 | 4.19 |
| 11 | Al(OH)₃ | 2.5 | 54.1 | 0.49 |

From the data in Table V it will be seen that only the compounds of the metals calcium, arsenic, antimony, lead, and tin had the property, when used in minor amounts, of inhibiting corrosion of the bomb by the reaction mixture and that each of the other compounds tested not only failed to prevent corrosion, but actually accelerated the corrosion. The difference between the effect of calcium in Run 1 and the effects of the oxides of barium, strontium, and magnesium in Runs 8–10 is particularly interesting.

The oxides, hydroxides, and hydrolyzable compounds of calcium, arsenic, antimony, lead, or tin may also be employed in small proportion with advantage to inhibit the corrosion of reactors constructed of ferrous metals during employment of the same in carrying out other ammonolysis reactions. For instance, the invention may be applied with advantage in carrying out the ammonolysis of: bromobenzene to form aniline; bromonaphthalene to form naphthylamine; chloro-toluene to form toluidine; ethylchlorobenzene to form amino-ethylbenzene; chloro-diphenyl to form amino-diphenyl; or chloro-diphenyloxide to form amino-diphenyloxide; etc.

Other modes of applying the principle of the invention may be employed instead of those explained, change being made as regards the method herein disclosed provided the step or steps stated by any of the following claims or the equivalent of such stated step or steps be employed.

I, therefore, particularly point out and distinctly claim as my invention.

1. In a method wherein an aromatic amine is prepared by reacting ammonia with an aryl halide in the presence of a copper-containing catalyst and within a reactor constructed of a ferrous metal, the step of carrying the reaction out in the presence of a compound selected from the class consisting of the oxides and hydroxides of calcium, tin, lead, arsenic, and antimony, said compound being employed in amount corresponding to less than 0.25 molecular equivalent thereof per mole of the aryl halide reactant, whereby corrosion of the reactor is inhibited.

2. In a method wherein aniline is prepared by heating a mixture of aqueous ammonia, chlorobenzene, and a copper-containing catalyst in a reactor constructed of a ferrous metal, the step of carrying the reaction out in the presence of between 0.08 and 0.25 molecular equivalent of a compound selected from the class consisting of the oxides and hydroxides of calcium, tin, lead, arsenic, and antimony per mole of chlorobenzene employed as a reactant, whereby corrosion of the reactor is inhibited.

3. In a method wherein an aromatic amine is prepared by heating a mixture of aqueous ammonia, an aryl halide, and a copper-containing catalyst in a reactor constructed of a ferrous metal, the step of carrying the reaction out in the presence of lime in amount corresponding to less than 0.25 molecular equivalent thereof per mole of the aryl halide reactant, whereby corrosion of the reactor is inhibited.

4. In a method wherein an aromatic amine is prepared by heating a mixture of aqueous ammonia, an aryl halide, and a copper-containing catalyst in a steel reactor, the step of carrying the reaction out in the presence of between 0.08 and 0.25 chemical equivalent of lime per mole of the aryl halide reactant, whereby corrosion of the reactor is inhibited.

5. In a method wherein aniline is prepared by heating a mixture of aqueous ammonia, a monohalo-benzene, and a copper containing catalyst in a reactor constructed of a ferrous metal, the step of carrying the reaction out in the presence of lime in amount corresponding to less than 0.25 molecular equivalent thereof per mole of the monohalo-benzene, whereby corrosion of the reactor is inhibited.

6. In a method wherein aniline is prepared by heating a mixture of aqueous ammonia, chlorobenzene, and a copper-containing catalyst in a steel reactor, the step of carrying the reaction out in the presence of between 0.08 and 0.25 chemical equivalent of lime per mole of the aryl halide reactant, whereby corrosion of the reactor is inhibited.

7. In a method wherein aniline is prepared by heating a mixture of aqueous ammonia, chlorobenzene and a cuprous compound as catalyst in a steel reactor, the step of carrying the reaction out in the presence of between 0.08 and 0.25 molecular equivalent of lime per mole of the chlorobenzene reactant, whereby corrosion of the reactor is inhibited.

HAROLD R. SLAGH.

Certificate of Correction

Patent No. 2,391,848. December 25, 1945.

HAROLD R. SLAGH

It is hereby certified that errors appear in the printed specification of the above numbered patent requiring correction as follows: Page 3, first column, line 52, in the table, second column thereof, for "1.134" read *0.134*; page 4, first column, line 54, after "calcium" insert *oxide*; and that the said Letters Patent should be read with these corrections therein that the same may conform to the record of the case in the Patent Office.

Signed and sealed this 30th day of April, A. D. 1946.

[SEAL]

LESLIE FRAZER,
*First Assistant Commissioner of Patents.*